(12) United States Patent
Aoki

(10) Patent No.: US 7,131,512 B2
(45) Date of Patent: *Nov. 7, 2006

(54) COLLISION DETECTING DEVICE AND PASSIVE SAFETY SYSTEM

(75) Inventor: Hiroshi Aoki, Ritto (JP)

(73) Assignee: Takata Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/405,531

(22) Filed: Apr. 2, 2003

(65) Prior Publication Data

US 2004/0011582 A1    Jan. 22, 2004

(30) Foreign Application Priority Data

Apr. 3, 2002  (JP) ............................. 2002-101425
Dec. 10, 2002  (JP) ............................. 2002-358229

(51) Int. Cl.
*B60D 1/28* (2006.01)
(52) U.S. Cl. ................................................... 180/271
(58) Field of Classification Search ................ 180/274, 180/271; 280/735
See application file for complete search history.

(56) References Cited

U.S. PATENT DOCUMENTS

| | | | | |
|---|---|---|---|---|
| 5,390,951 A * | 2/1995 | Iyoda | .................. | 280/730.2 |
| 5,435,409 A * | 7/1995 | Meyer et al. | .................. | 180/274 |
| 6,047,985 A | 4/2000 | Yoshida | | |
| 6,236,308 B1 * | 5/2001 | Dalum | .................. | 340/436 |
| 6,516,278 B1 * | 2/2003 | Ishizaki et al. | .................. | 702/33 |
| 6,600,412 B1 * | 7/2003 | Ishizaki et al. | .................. | 340/436 |
| 6,693,549 B1 | 2/2004 | Stuetzler | | |
| 2001/0028163 A1 | 10/2001 | Breed | | |
| 2002/0033755 A1 | 3/2002 | Ishizaki et al. | | |
| 2004/0020701 A1 | 2/2004 | Aoki | | |

FOREIGN PATENT DOCUMENTS

| | | |
|---|---|---|
| EP | 0 900 702 A2 | 3/1999 |
| EP | 0 937 612 A2 | 8/1999 |
| EP | 0 937 612 A3 | 3/2000 |
| EP | 0 900 702 A3 | 4/2001 |
| JP | 11-78770 | 3/1999 |
| JP | 2001-171476 | 6/2001 |
| WO | WO - 01/55729 A2 | 8/2001 |
| WO | WO - 01/55729 A3 | 8/2001 |

* cited by examiner

*Primary Examiner*—Faye M. Fleming
(74) *Attorney, Agent, or Firm*—Fitch, Even, Tabin & Flannery

(57) ABSTRACT

A collision detecting device providing the accurate and early determination of a collision with a vehicle or the like, and a passive safety system using this collision detecting device. A low-rigid portion and a crash box are arranged ahead of a high-rigid portion in a front portion of a frame. The front end of a rod is fixed to a bumper. The rod is inserted into a magnetic detector disposed on the high-rigid portion. In the rod, a number of magnets are aligned in the longitudinal direction of the rod such that their N poles and S poles are alternatively arranged. As a vehicle collides, the crash box is first deformed so that the rod moves backward, whereby a collision can be detected before large acceleration is generated.

31 Claims, 5 Drawing Sheets

COLLISION DETECTING DEVICE AND PASSIVE SAFETY SYSTEM

FIELD OF THE INVENTION

The present invention relates to a collision detecting device for detecting a vehicle collision and a passive safety system, such as an airbag device or a seat belt device using the same.

BACKGROUND OF THE INVENTION

Airbag devices for protecting an occupant by inflating an airbag during a vehicle collision, and pretensioners for removing a slack of a webbing of a seat belt device by rapidly winding up a predetermined length of the webbing are well known. For activating such an airbag device or a pretensioner, it is required to determine the occurrence of a vehicle collision and the magnitude of the vehicle collision (crash severity). The crash severity correlates with the relative velocity to the object and the mass and the rigidity of the object.

Conventionally, the acceleration is detected for determining the magnitude of the collision. For example, in Japanese Patent Unexamined Publication No. 11-78769, the crash severity is determined on the bases of the magnitude of acceleration, the variation with time of the acceleration, and the variation with time of the velocity. In this publication, the variation with time of the velocity is obtained from the values by integrating the acceleration with time.

A collision determining method by detecting the deformation of an exterior member of a vehicle due to the collision is disclosed in Japanese Patent Unexamined Publication No. 11-78770. Distortion sensors are mounted on the exterior member of the vehicle so as to detect the deformation amount and the deformation speed of the exterior member, thereby determining the magnitude of the collision. It also should be noted that the protection of an occupant will be sometimes referred to as "restraint". In addition, acceleration means acceleration (the derivative with respect to time of speed) acting on a vehicle in the decelerating direction during a collision.

A collision determining method by detecting the deformation speed of a front part of a vehicle during deformation of the vehicle body due to the collision is disclosed in Japanese Patent Unexamined Publication No. 2001-171476. According to this publication, acceleration sensors are disposed at two predetermined locations on a vehicle body so as to detect the compressive deformation speed of the vehicle body between the two sensors, thereby determining the magnitude of the collision.

In the collision determining method by detecting the acceleration disclosed in Japanese Patent Unexamined Publication No. 11-78769, the result of collision determination and crash severity is affected by the structure of a vehicle around a collided portion, the rigidity of the object, and the like.

In the collision determining method disclosed in Japanese Patent Unexamined Publication No. 11-78770, the deflection speed of the exterior member can be detected by the sensors mounted on the exterior member. However, the detected deflection speed is not always the deformation speed of the vehicle body structure in an impact loading direction. In addition, since the deformation stroke of the exterior member is generally short, it is difficult to detect the deformation speed on the way of progress of collision deformation.

Therefore, it is difficult to determine in an early stage of collision whether the collision is a collision between the vehicle and a small-mass high-velocity object with which only the exterior member is deformed (a collision not creating such a vehicle deceleration that occupant restraint by a passive safety system is needed) or a medium-velocity barrier collision with which the vehicle body is largely deformed (a collision creating such a vehicle deceleration that occupant restraint by a passive safety system is needed). That is, it is difficult to determine the occurrence of collision and the crash severity from the deformation speed of the exterior member.

The collision determining method disclosed in Japanese Patent Unexamined Publication No. 2001-171476 is not a method of detecting the deformation speed of the vehicle front end portion. As one of the acceleration sensors is located at the vehicle front end, an excess impact over the rated value of the sensor is exerted on the sensor in an early stage of a collision so that the mounting portion of the sensor is deformed, thus shifting off the detection axis of the sensor. With the shifted detection axis of the sensor, the deformation speed of the vehicle front end can not be properly detected.

SUMMARY OF THE INVENTION

It is an object of the present invention to provide a collision detecting device which can determine the occurrence of a collision and the magnitude of the collision (crash severity) at an early stage with high precision by detecting the collision deformation speed of a portion around an end of a vehicle, and to provide a passive safety system using this collision detecting device.

A collision detecting device of the present invention comprises a deformation-speed detecting means for detecting a deformation speed of a portion around an end of a vehicle and is characterized in that the collision detecting device detects a collision on the basis of the deformation speed detected by the deformation-speed detecting means. In addition, a passive safety system comprises a restraint means which is activated on the basis of a signal of the collision detecting device.

In the occupant restraint means, it is important to determine the magnitude and the time of acceleration (deceleration) from the start of a vehicle collision at an early stage. The object of the present invention is to detect (or estimate) such information at an early stage with high precision. On the basis of the detection result, the determination of the occurrence of a collision and the magnitude of the collision by the collision detecting device of the present invention are carried out.

According to the present invention, when a vehicle comes into a frontal collision, the determination of the occurrence of a collision and the magnitude of the collision are allowed by detecting the deformation speed of a portion around the front end of the vehicle. Since, during the frontal collision, the portion around the front end of the vehicle first collides with an object so as to initiate compressive deformation, the compressive deformation speed of the front end portion of the vehicle structure is detected, whereby the occurrence and the magnitude of the collision can be determined at the early stage.

Though acceleration acts on the vehicle due to the collision, the acceleration varies depending on the rigidity of a portion of the vehicle body being deformed (crashed) according to the collision. For example, the reduction in vehicle velocity is gentle when the deformed portion has low rigidity so that the acceleration acting on the vehicle is small. On the other hand, the reduction in vehicle velocity is drastic when the deformed portion has high rigidity so that the acceleration acting on the vehicle is large.

When the front end portion of the vehicle body is structured to have relatively low rigidity in order to absorb impact during a collision, the acceleration to be detected in the collision detecting method based on the acceleration is small at a very early stage when the front end portion starts to be deformed so that the collision detecting accuracy must be low. According to the deformation speed detecting method of the present invention, however, the deformation speed of the front end portion is detected so that a large deformation speed is detected even at a very early stage when only the front end portion is deformed. Therefore, the occurrence of a collision and the magnitude of the collision can be determined at a high precision.

To detect the deformation speed of a portion around an end of a vehicle, it is preferable to detect variations with time of distance between a first portion at relatively outer position (for example, front position) around the end and a second portion at relatively inner position (for example, rear position) for a predetermined distance from the first portion, that is, the approaching speed of the first and second portions.

In case of such a collision that needs the activation of a restraint system, such as an airbag device, a large deformation is generated on the vehicle. To detect the collision instantaneously, it is required to determine the magnitude of the collision at an early stage of the occurrence of crash. However, since deformation due to vibration and companding/extruding is generated on portions of the vehicle body during the collision, it is required to detect crash due to plastic deformation except such deformation due to vibration and companding/extruding. Therefore, it is preferable that deformation amounts over a stroke of 20 millimeters or more are continuously detected, whereby the deformation speed is calculated. That is, it is preferable that deformation speeds are continuously detected when the vehicle body portions deform 20 millimeters or more.

To detect the approaching speed of the two portions, the moving speeds of rods laid to extend between the two portions may be detected or the distance between the two portions may be measured by using electric waves, infrared rays, or ultrasound. The method of detecting the approaching speed is not limited thereto.

If the vehicle body has an impact absorbing structure and comprising a relatively low-rigid member near an outermost position and a relatively high-rigid member at an inner position relative to the low-rigid member, it is preferable that the first portion is arranged on the low-rigid member and the second portion is arranged on a high-rigid member, thereby achieving the stable detection of the deformation speed.

Even if an outer portion and an inner portion of the vehicle structure (body frame) have the same rigidity, the deformation proceeds sequentially from the outer portion to the inner portion in the vehicle structure during a collision. Therefore, the deformation speed to be detected can be obtained from the relative displacement between the first portion and the second portion and from the speed of the displacement.

In the present invention, the deformation speed detecting means are preferably disposed on left and right front portions of the vehicle, respectively, thereby facilitating the determination of a full-overlap collision and an offset collision.

According to an embodiment of the present invention, it is determined that a collision with a magnitude exceeding a predetermined value, e.g. a collision with such a magnitude as to actuate a passive safety system, such as an airbag device, has occurred when a deformation speed exceeding a predetermined value is detected for a predetermined period of time. This method enables the determination of a collision at the early stage of a collision.

The collision detecting device may comprise an evaluating means for evaluating the progress of a collision from the magnitude of the deformation speed, the elapsed time, and the increasing/decreasing tendency on the basis of the deformation speeds detected continuously by the aforementioned deformation speed detecting means so that the collision detecting device determines that the collision occurs when the evaluating means evaluates that the collision progresses.

According to another embodiment of the present invention, the deformation speed and the acceleration are detected. On the basis of the deformation speed and the acceleration, it is determined that a collision with a magnitude exceeding a predetermined value has occurred. For example, when both the deformation speed and the acceleration exceed their respective predetermined values or when either one of the deformation speed and the acceleration exceeds the corresponding predetermined value, it is determined that a collision with a magnitude exceeding a predetermined value has occurred. The determination method has high reliability on determination result and enables the determination of the crash severity with high precision or at the early stage.

Further, according to still another embodiment of the present invention, the deformation speed, the acceleration, and the deformation amount are detected. On the basis of the deformation speed, the acceleration, and the deformation amount, it is determined that a collision with a magnitude exceeding a predetermined value has occurred. For example, when all of the deformation speed, the acceleration, and the deformation amount exceed their respective predetermined values, it is determined that a collision with a magnitude exceeding a predetermined value has occurred. The determination method has further high reliability on determination result.

According to a different embodiment of the present invention, the determination of a collision is made on the basis of the acceleration and the criteria of collision determination is changed according to the deformation speed detected by the deformation speed detecting means. For example, when the deformation speed is large, the threshold value of collision determination is set to be lower. On the other hand, when the deformation speed is small, the threshold value of collision determination is set to be higher. Therefore, it is enables the determination of the occurrence of a collision at an early stage or with high precision.

If the deformation stress of portions, which may be compressed by load generated by a collision and thus elastically deformed or plastically deformed, are previously known, the work required for deformation of the vehicle can be detected from a product of the deformation speed of the portion around the end of the vehicle, the deformation amount per a predetermined time, and the deformation stress of the deformed portion. The deformed portion may be an end portion of the vehicle, including a bumper beam, bumper fixing arms, and front forks on sides of the vehicle.

That is, since the maximum value of the deformation speed correlates with the relative velocity and a value, which is obtained by dividing the work by a square value of the difference speed of the deformation speed in the predetermined time, correlates with the working mass, the relative velocity between a vehicle and an object colliding with the vehicle and the working mass can be estimated at the start of the collision. Based on the relative velocity and the working mass, it can be determined how large the acceleration (deceleration) acting on the vehicle after a lapse of a time will be, that is, the collision magnitude can be determined.

In this embodiment, the acceleration acting on the vehicle may also be detected and the collision magnitude may be determined on the basis of the acceleration and the work. When the acceleration of the vehicle is small, the weight of the object colliding with the vehicle can be estimated from the working mass because the working mass corresponds to the equivalent mass of the object.

For sensing a frontal collision by using the acceleration, for example, deformation speed detecting means are placed on the front end of the vehicle and detect the distance or the variation in distance in the vehicle longitudinal (front-to-back) direction between a deforming portion including a peripheral structure and a stationary portion due to deformation of the vehicle. The deforming portion may be a front frame or an end of a side frame of the vehicle including at least a bumper, a bumper beam, and bumper fixing arms. The aforementioned acceleration detecting means is placed on a side frame at an inner position relative to the front portion of the vehicle or a vehicle structural portion on the rear side relative to the side frame.

According to a further embodiment of the present invention, the deformation speed and the deformation amount are detected and, on the basis of these detected values, it is determined that a collision with a magnitude exceeding a predetermined value has occurred. For example, when both the deformation speed and the deformation amount exceed their respective predetermined values or when the detected deformation amount exceeds its predetermined value during the deformation speed exceeding its predetermined value is detected, or when either one of the deformation speed and the deformation amount exceeds the corresponding predetermined value, it is determined that a collision with a magnitude exceeding a predetermined value has occurred. The determination readily enables the determination of the crash severity at an early stage of collision with high precision.

Because the result of collision determination can be obtained with sufficient precision and at an early stage, the actuation of the airbag device can be made earlier. Therefore, the utilization of a small capacity inflator for inflating an airbag with large volume is achieved.

Since the collision magnitude can be determined at an early stage with high precision according to the present invention, the timing for actuating passive safety systems, such as an airbag device, can be easily controlled. In addition, according to the determination, the inner pressure of the airbag can be controlled and/or the amount of webbing to be wound by a pretensioner can be controlled.

The collision detecting device of the present invention may determine the magnitude of collision and may further comprise an output means which can output reference signals corresponding to the magnitude of collision. This structure further facilitates the control of the passive safety systems.

In case of also determining the type of collision, such as a full-overlap collision and an offset collision, the airbag device and/or the pretensioner can be controlled to have various patterns.

DETAILED DESCRIPTION OF THE PREFERRED EMBODIMENTS

Figure 1:
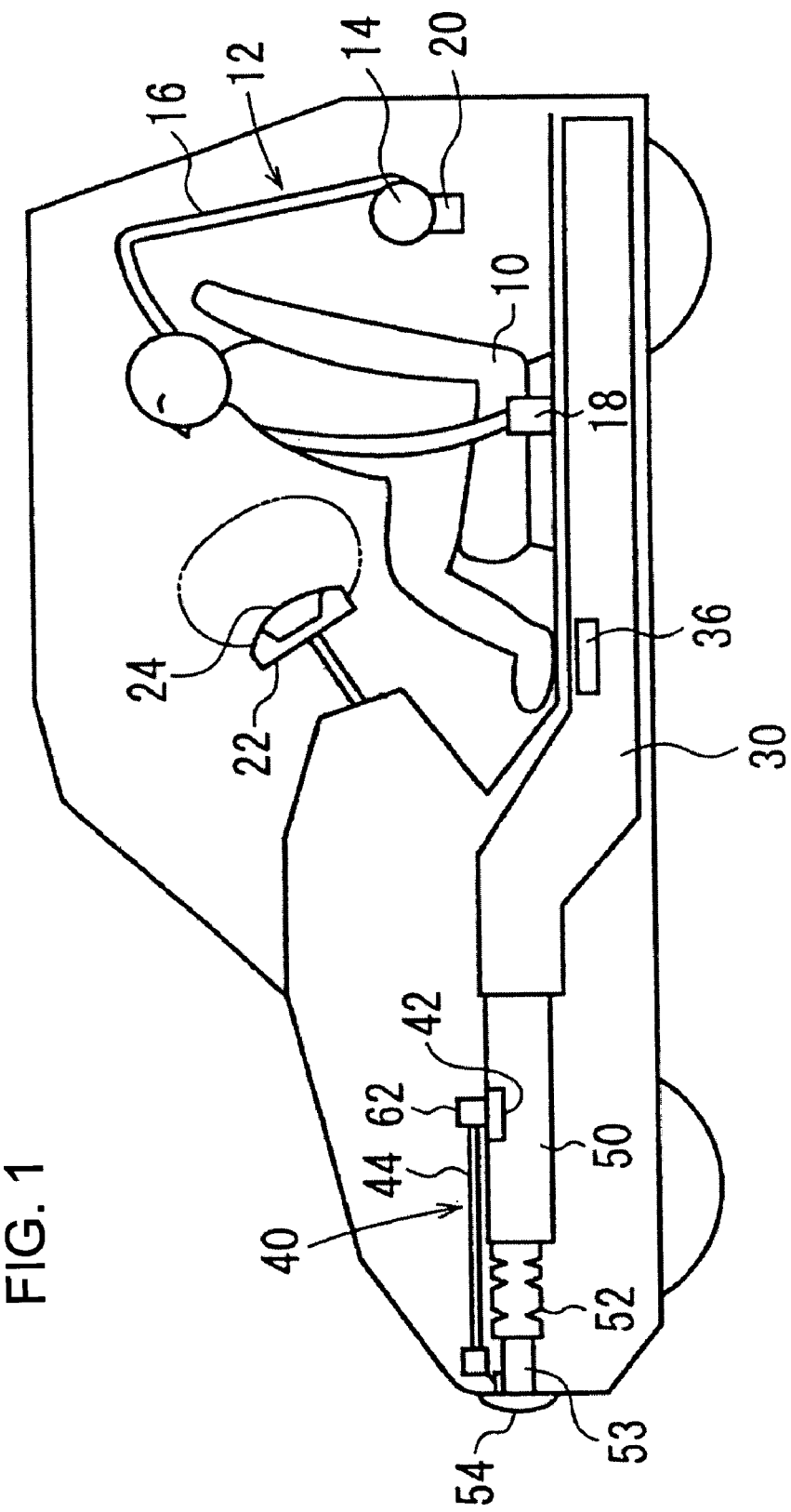
FIG. 1 is a side elevational view of a vehicle equipped with a collision detecting device and a passive safety system according to an embodiment.
Figure 2:
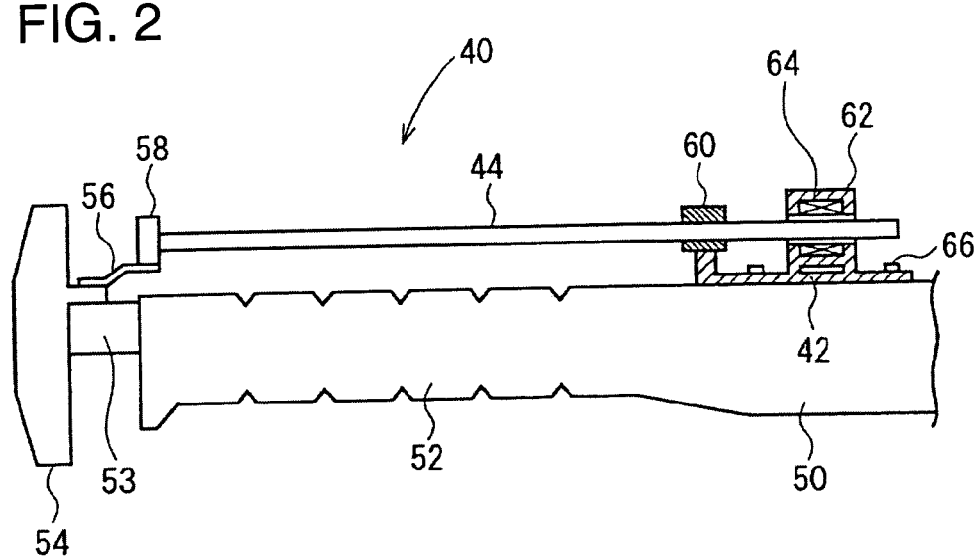
FIG. 2 is a side elevational view of a collision detecting device according to the embodiment of FIG. 1.

Hereinafter, embodiments of the present invention will be described with reference to the attached drawings. FIG. 1 is a schematic side elevational view showing the structure of a vehicle equipped with a collision detecting device and a passive safety system according to the embodiment, FIG. 2 is a side elevational view showing the structure of the collision detecting device, and FIG. 3 is a plan view showing the configuration of a front portion of a vehicle body frame.

A seat 10 is installed in a vehicle cabin of a vehicle, and a seat belt device 12 is installed for restraining an occupant sitting on the seat 10. The seat belt device 12 comprises a retractor 14, a webbing 16 to be withdrawn from the retractor 14, a buckle 18 to be latched with a tongue (not shown) for the webbing 16, and a pretensioner 20 attached to the retractor 14. The pretensioner 20 functions to rapidly wind up a predetermined length of the webbing 16 during a collision.

An airbag device 24 is installed in a steering assembly 22 in front of the seat 10. The airbag device 24 comprises a folded airbag, a module cover for covering the airbag, an inflator (gas generator) for inflating the airbag, and the like.

Figure 3:
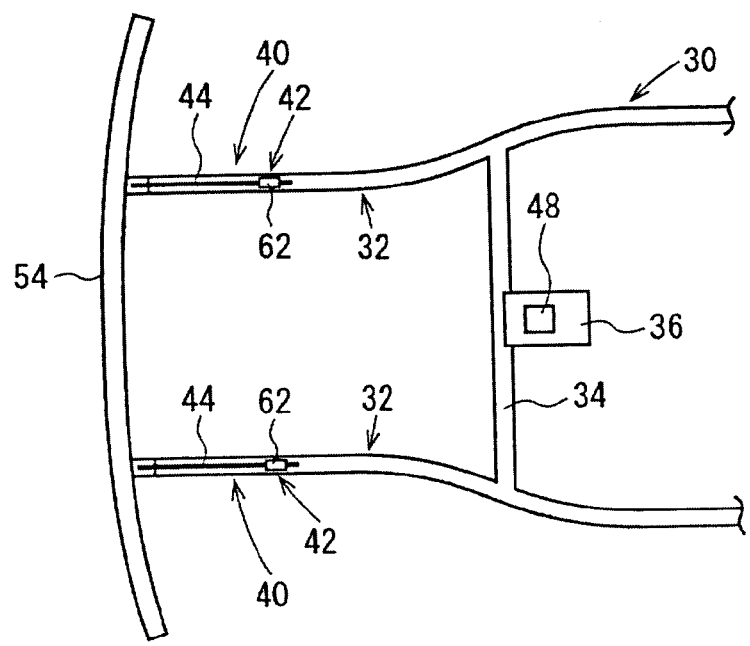
FIG. 3 is a plan view of a vehicle body frame of the vehicle equipped with the collision detecting device and the passive safety system of FIG. 1.

A vehicle frame 30 comprises side members 32, 32, and a cross member 34 laid to extend between the side members 32, 32 as shown in FIG. 3. Disposed on both the cross member 34 and the floor panel is a control unit 36, which determines the occurrence of a vehicle collision and then supplies current to activate the pretensioner 20 and the airbag device 24. Even with a significant severe collision, deformation never reaches the cross member 34 so that the control unit 36 can output a control signal through the collision.

In this vehicle, deformation speed sensors 40 and acceleration sensors 42, 48 are installed for detecting a collision against the front of the vehicle (frontal collision). Detection signals of the sensors 40, 42, 48 are inputted into a control circuit in the control unit 36.

The deformation speed sensors 40 and the acceleration sensors 42 are disposed on the front portion of the left and right side members 32 of the frame 30. The acceleration sensor 48 is built in the control unit 36.

The deformation speed sensors 40 move rods 44 backwards according to the deformation of front end portions of the vehicle and detects the speed of backward movement of the rods 44 so as to determine the deformation speed at the front end portion of the vehicle.

As shown in FIG. 2, low-rigid portions 52 are provided at the front portion of the frame 30 through high-rigid portions 50, respectively. Connected to front ends of the low-rigid portions 52 is a bumper 54. Disposed between the bumper 54 and the low-rigid portions 52 are crash boxes 53 which also have low rigidity. The rods 44 extend in the longitudinal (front-to-back) direction of the vehicle and have front ends which are fixed to the bumper 54 through rod fixing plates 58.

The rear ends of the rods 44 are slidably supported by guides 60 so that rear end portions of the rods 44 are loosely inserted into sensor boxes 62, respectively. The sensor boxes 62 are fixed to the high-rigid portions 50, respectively.

In each rod 44, a large number of magnets are aligned serially at predetermined intervals in the longitudinal direction of the rod 44 such that their N poles and S poles are alternatively arranged. Disposed in each sensor box 62 is a magnetic detector 64 such as a coil or a hall element which senses fluxes from the magnets. The magnetic detector 64 outputs an electric signal of one pulse every time one of the magnets passes through the magnetic detector 64 according to the backward movement of the rod 44. By counting the number of pulses per unit time period, the speed of backward movement of the rod 44 can be detected.

In this embodiment, the acceleration sensor 42 is also provided in the sensor box 62. The guide 60 is integrally formed with the sensor box 62. By installing the sensor box 62, the acceleration sensor 42 and the guide 60 are automatically disposed on the high-rigid portion 50. Numeral 66 designates a bolt for installing the sensor box 62 to the high-rigid portion 50. A circuit for outputting a signal from the magnetic detector 64 and a circuit for outputting an acceleration signal may be partly combined and may be provided on a common circuit board.

When the vehicle equipped with the collision detecting device and the passive safety system having the aforementioned structure comes into collision, the crash boxes 53 having low rigidity are mainly first deformed to crash. If the collision is medium-scale, the low-rigid portions 52 are also deformed to crash. If the collision is relatively severe, the high-rigid portions 50 are also deformed to crash. The crash boxes 53 are portions which first crash after collision and have low rigidity. Therefore, the rise rate in deformation speed of the crash boxes 53 is so high to move the rods 44 backwards at a relatively high speed just after the vehicle collides with an object. The speed of this backward movement is detected from pulses produced by the magnetic detectors 64. When impact maintains even after the crash boxes 53 completely crashed, the low-rigid portions 52 are deformed to crash so that the rods 44 continuously move backwards. The speed of the backward movement of the rods 44 is the deformation speed at the front end portion of the vehicle. The deformation speed is substantially in proportion with the relative velocity between the vehicle and the object. The higher the relative velocity is, the more severe the collision is. Accordingly, by detecting the speed of the backward movement of the rods 44 from pulses produced by the magnetic detectors 64, the relative velocity to the object during the collision, i.e., the crash severity can be determined.

In this embodiment, the deformation speed sensors 40 are arranged on the left and right sides of the vehicle. The deformation speeds of the left side and the right side of the vehicle can be separately measured. Therefore, it can be determined whether the present collision is a full-overlap collision or an off-set collision.

Also in this embodiment, each sensor box 62, including the magnetic detector 64 for monitoring the speed of the backward movement of the rod 44, is located at a position far from the front end of the vehicle. Accordingly, the sensor box 62 is not directly affected by deformation and distortion of the vehicle due to the collision, and the sensor box 62 is not broken by such a small collision that an area around the bumper is only deformed, thereby cutting the cost for repair and replacement.

Figure 7:
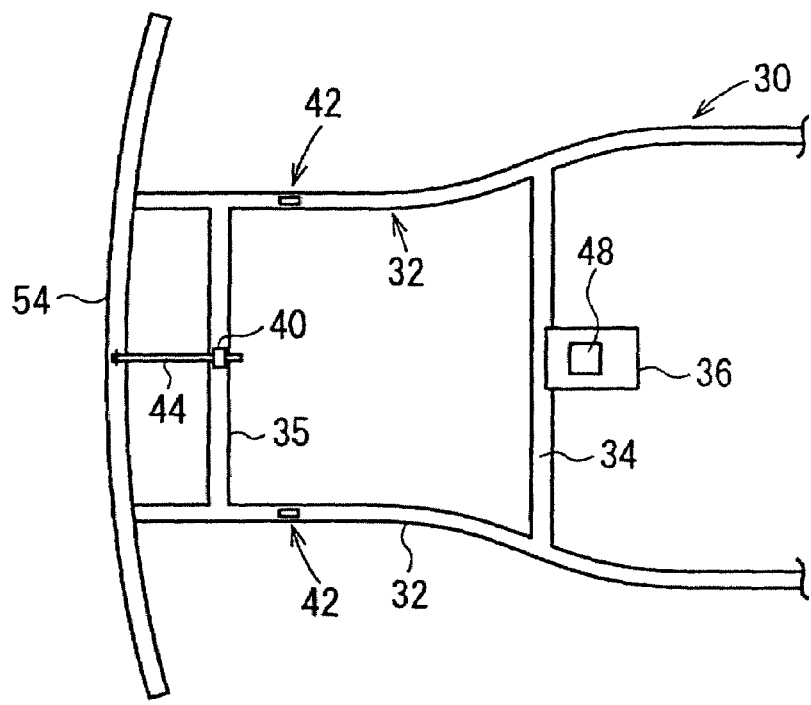
FIG. 7 is a plan view of a vehicle frame equipped with a collision detecting device and a passive safety system according to another embodiment.

Though the deformation speed sensor 40 is arranged on either side of the vehicle in the aforementioned embodiment as shown in FIG. 3, the deformation speed sensor 40 may be arranged in the middle of the lateral direction of the vehicle as shown in FIG. 7. FIG. 7 is a plan view of a vehicle frame similar to FIG. 3, but showing the structure of a vehicle equipped with a collision detecting device and a passive safety system according to another embodiment.

In FIG. 7, a connecting member 35 is laid to extend between the side members 32, 32. The connecting member 35 is located near the bumper 54 relative to the cross member 34. A deformation speed sensor 40 is disposed in the middle of the connecting member 35. One end of a rod of the deformation speed sensor 40 is connected to the bumper 54. Acceleration sensors 42, 42 are disposed on the two side members 32, 32, respectively. The other structure is the same as that of the embodiment shown in FIG. 3 so that the same numerals designate the same parts.

As the vehicle comes into collision, the rod 44 moves backwards, thereby measuring the deformation speed of a portion around the front end of the vehicle according to the aforementioned structure. The acceleration is also detected by the acceleration sensors 42.

Since the deformation speed of a middle portion of the bumper 54 is measured, the deformation speed sensor 40 achieves the effective detection of a pole collision. Such pole collision is hardly detected by a conventional collision sensor using acceleration sensor(s). By combining information from the deformation speed sensor 40 and information of the acceleration sensors 42, the collision detection time can be shortened.

Figure 4:
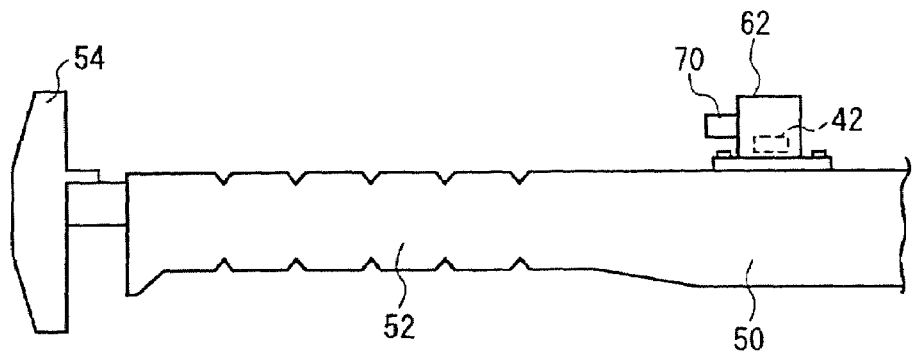
FIG. 4 is a side elevational view of a collision detecting device according to another embodiment.
Figure 5:
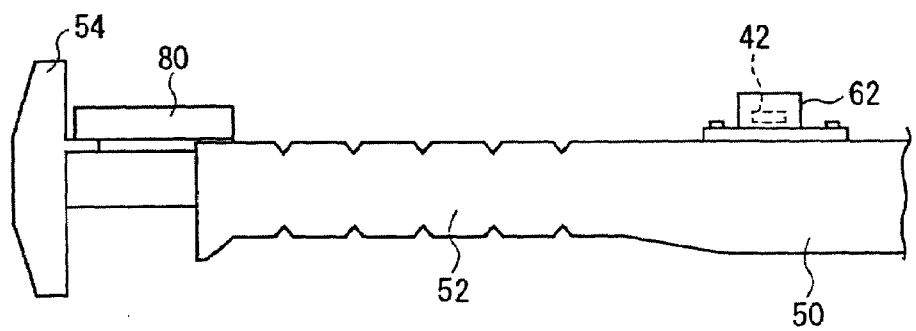
FIG. 5 is a side elevational view of a collision detecting device according to still another embodiment.

FIGS. 4 and 5 are structural illustrations of collision detecting devices according to other embodiments, respectively. In the embodiment shown in FIG. 4, a millimeter wave radar 70 is provided in a sensor box 62 on each high-rigid portion 50 so that the distance between the millimeter wave radar 70 and a bumper 54 is measured. From variations in distance during a collision, the speed of the bumper 54 moving toward the millimeter wave radar 70, i.e. the deformation speed of the low-rigid portion 52, can be detected. The distance may be the distance relative to a front beam, a front grille, or radiator besides the bumper.

To limit the detection portion, a waveguide such as a wave guide tube is provided for guiding propagating waves, a reflection plate is fixed to the detection portion, a directional antenna, an inductive lens, or an acoustic lens is provided for converging propagating waves so as to narrow the area.

The propagating waves, electromagnetic waves, millimeter waves, light beams, or acoustic waves may be employed. As the detecting method, various methods, such as a relative velocity detecting method using Doppler effects and a distance detecting method using propagation delay time of pulse wave, may be available. Examples of the suitable sensor include an ultrasonic wave sensor of 40 kHz through 500 kHz, an infrared laser sensor, and a radar of 1 GHz through 24 GHz, but the sensor is not limited thereto.

In the embodiment shown in FIG. 5, a switching element 80 is disposed to extend over each crash box 53. The switching element 80 generates a pulse signal or stops the output of signals the moment a collision occurs. Arranged in the sensor box 62 is only an acceleration sensor 42. From the signal (or variation in signal) of the switching element 80, a control circuit of a control unit 36 detects the moment the vehicle collides with an object. At the same time of the collision, the crash box 53 starts to crash. After that, the low-rigid portions 52 at the front portions of side members 32 crash. During this, the acceleration detected by the acceleration sensor 42 is relatively small. When the crashing deformation reaches high-rigid portion 50, the speed of forward movement of the vehicle is rapidly reduced so that the acceleration detected by the acceleration sensor 42 is rapidly increased. The deformation speed is obtained by detecting a time period "t" from the moment the signal (or variation in signal) is outputted by the switching element 80 until the moment the acceleration is rapidly changed, and dividing the distance "L" from the switching element 80 to the front end of the high-rigid portion 50 by the detected time period "t". That is, L/t is the deformation speed.

Figure 6A:
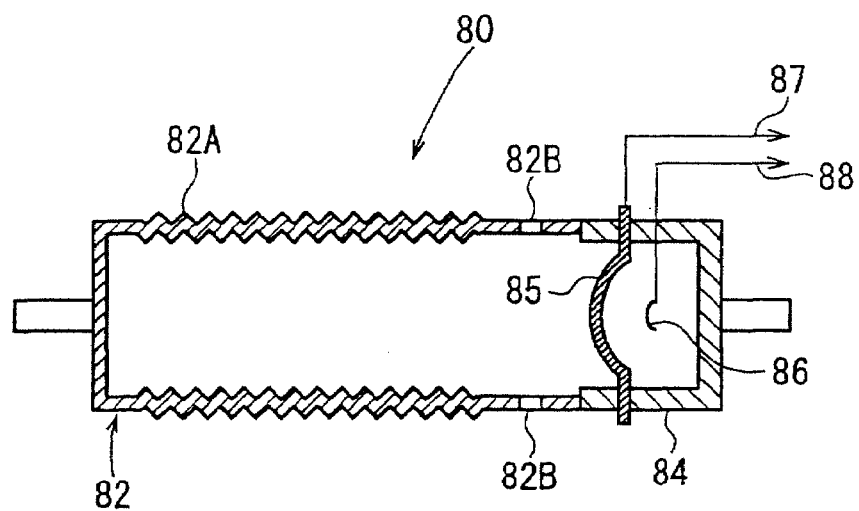
FIG. 6(a) shows the state of a switching element when installed.
Figure 6B:
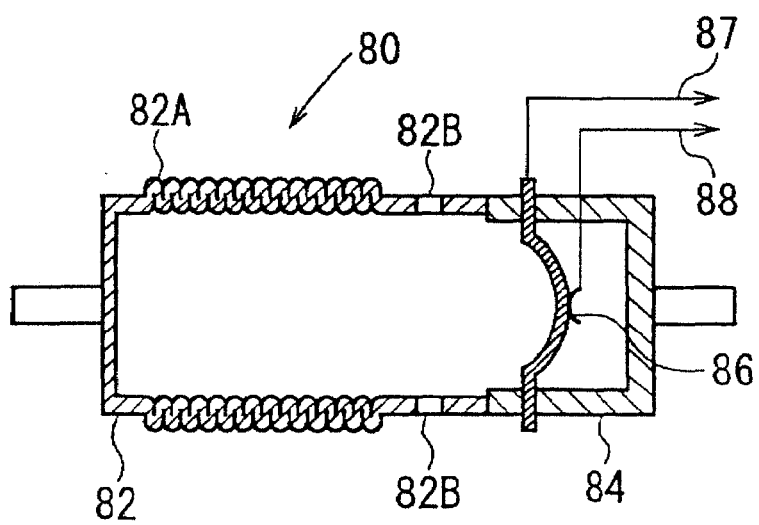
FIG. 6(b) shows the state of the switching element after a vehicle collision.

FIGS. 6(a), 6(b) are sectional views showing an example of the switching element 80 shown in FIG. 5, wherein FIG. 6(a) shows the state before vehicle collision and FIG. 6(b) shows the state after the vehicle collision.

The switching element 80 comprises a substantially cylindrical cap 84 and a substantially cylindrical casing 82. The open ends of these are connected to each and are air-tightly fixed. The switching element 80 is arranged such that the casing 82 side, i.e. the left side in the drawing, is on the vehicle front side.

The casing 82 has a bellows portion 82A at its middle portion in the axial direction. The casing 82 is provided near its open end with small apertures 82B. It should be noted that there are two small apertures 82B in this embodiment, the number of the small apertures may be one, or three or more.

A diaphragm 85 made of conductive material, such as a metal, is fixed to the cap 84. A contact 86 is disposed inside the cap 84 such that the contact 86 is positioned at the vehicle rear side relative to the diaphragm 85 and is spaced apart from the diaphragm 85. The diaphragm 85 is held relative to the cap 84 via electrical insulating materials (not shown). Terminals 87,88 are connected to the diaphragm 85 and the contact 86, respectively. The diaphragm 85 is curved to have a convex portion projecting toward the vehicle front side. When the volume of air within the casing 82 is changed due to variation in temperature, air flows into or out of the casing 82 through the small apertures 82B so as to keep the pressure in the casing 82 constant. A similar small aperture (not shown) is formed in the cap 84 so that a chamber formed behind the diaphragm is in communication with the atmosphere.

As a vehicle collides and the crash box 53 is thus deformed, the switching element 80 is collapsed so that the bellows portion 82A of the casing 82 is compressed, as shown in FIG. 6(b), so as to increase the inner pressure in the casing 82 of the switching element 80. The increased pressure deforms the diaphragm 85 to have a convex portion projecting toward the vehicle rear side, whereby the diaphragm 85 and the contact 86 come in contact with each other. Therefore, a pulse signal is created so that it is detected the moment the vehicle collides with an object.

According to the switching element 80, even if a large impact is exerted to the switching element 80, the impact is absorbed by compressed air, thereby obtaining stable operation of the switching element 80.

The switching element may be positioned at any location where it can detect the displacement of the bumper. In addition, a plurality of switching elements may be used. In this case, deformation speeds at portions where the switching elements are fixed are obtained. The switching elements may be disposed on a straight line extending in the crashing direction. In this case, the crashing progress, that is, the rate of change in deformation speed can be obtained. Instead of the switching element, a pressure sensor and a comparator may be employed.

In any of the aforementioned embodiments, the deformation of the low-rigid portions, including the crash boxes, occurs immediately after the collision and prior to the deformation of the high-rigid portions. The crash severity can be determined from the deformation speed of the low-rigid portions.

In response to the result of the determination of crash severity, the airbag device 24 and/or the pretensioner 20 are activated to operate. Since the period of time from the point of the vehicle collision until the result of determination is obtained is short, it can take relatively enough time for operating the airbag device 24 and the pretensioner. For example, a relatively low-power inflator can be used for inflating the airbag. In addition, the internal pressure of the airbag and the winding-up amount by the pretensioner can be controlled according to the crash severity.

An evaluating means may be provided to evaluate the progress of the collision from the magnitude of the deformation speed, the elapsed time, and the increasing/decreasing tendency on the basis of the deformation speeds detected continuously by the aforementioned deformation speed means. In this case, it is determined that the collision occurs when it is evaluated that the collision progresses.

Figure 8:
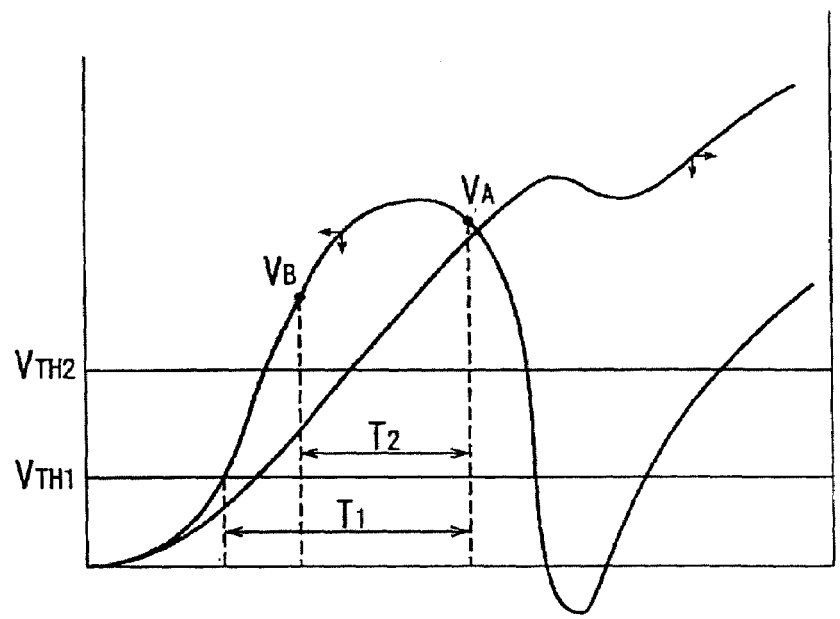
FIG. 8 is a graph showing variation with time of deformation speed and deformation amount during a vehicle collision.

Description will be made as regard to a method for determining a collision in case of a vehicle collision accompanied by variation with time of deformation speed and deformation amount as shown in FIG. 8 as an example. The abscissa of FIG. 8 indicates time, and the ordinate of FIG. 8 indicates the deformation speed and the deformation amount. $V_A$ is a deformation speed after the lapse of a predetermined time ($T_1$) from when the deformation speed reaches a predetermined value ($V_{TH1}$) due to a collision, and $V_B$ is a deformation speed a predetermined time ($T_2$) before the point of the lapse of the predetermined time ($T_1$). The increasing/decreasing tendency of the deformation speed at a time after the lapse of the predetermined time ($T_1$) is defined by:

Increasing/decreasing tendency of deformation speed=$(V_A-V_B)/T_2$.

When the deformation speed $V_A$ is a predetermined value $V_{TH2}$ or more and the increasing/decreasing tendency is in a predetermined range, the result of the determination shows the occurrence of collision. The type of collision (full-overlap collision, off-set collision) may be also considered in determining the crash severity.

In the present invention, on the basis of both the deformation speed and the acceleration, the occurrence of a collision and the crash severity may be determined. For example, only when the respective results of determinations according to the deformation speed and the acceleration both show that the collision occurs, the determination of the occurrence of the collision may be finally confirmed. In this case, the increased precision of determination is obtained. The reliability of detected value is increased by judging the effectiveness of deformation speed from the deceleration obtained from the acceleration sensor and the amount of deformation, thereby improving the resistance characteristic against malfunction of the occupant protective device due to an impact when running on a rough road, bumping against a curb, or subjected to hammer or maintenance impact.

In this case, the acceleration may be that detected from the acceleration sensor 48 or a combination of those detected from the acceleration sensor 48 and the acceleration sensors 42.

In this present invention, the occurrence of a collision may be determined when either one of detected values of deformation speed and the acceleration exceeds their respective predetermined value. In this case, quite early determination can be obtained.

By using the acceleration sensor as a safing sensor of which measured value is set to be smaller than the value judged by the collision determination, and obtaining a logical product between the acceleration sensor and the deformation speed sensor, the electrical or mechanical malfunction can be prevented.

Even when one of the sensors fails, the determination can be carried out only by a plurality of acceleration sensors just like the conventional manner or only by a plurality of deformation speed sensors. The OR structure decision or majority decision may be employed, thereby improving the reliability of collision determination.

In the present invention, it also may be provided with a means for deciding the effectiveness of the detected value of the speed detecting means or the effectiveness of the result of determination from the detected value, on the basis of the acceleration detected by the acceleration detecting means, a means calculating the variation in speed of a vehicle body to which the acceleration detecting means is fixed, the variation in moving distance as an integrated value of the variations in speed or corresponding values relative to the variation in speed and the variation in moving distance, and the calculated values.

In the case of determinations based on both the deformation speed and the acceleration, the evaluation weighting ratio between the deformation speed and the acceleration may be changed according to the magnitude of deformation speed.

In the present invention, the occurrence of a collision or the crash severity may be determined by comparing the acceleration detected by the acceleration sensor 42 to a threshold value. In addition, the threshold value may be set based on the deformation speed.

Further, in the present invention, it may be provided with a deformation amount detecting means for detecting the amount of deformation occurring on the vehicle body. In this case, the determination is made on the basis of the deformation amount and the aforementioned deformation speed. Alternatively, the determination may be made on the basis of the deformation amount, the aforementioned deformation speed, and the aforementioned acceleration.

To detect the deformation amount, for example, a method of detecting the moving amount of the rod 44 from the count of pulses from the magnetic detector 64 may be employed in the embodiment shown in FIGS. 1 through 3, and a method of detecting the deformation amount of the vehicle body from the variation in distance between the millimeter wave radar 70 and the bumper 54 measured by the millimeter waver radar 70 may be employed in the embodiment shown in FIG. 4. The method, however, is not limited particularly and other various methods and measuring devices may be employed.

According to the aforementioned structure, for example, the occurrence of a collision and the crash severity may be determined when either one of detected values of deformation speed and the deformation amount exceeds their respective predetermined value. In this case, quite early determination can be obtained. Alternatively, the determination of the occurrence of the collision may be finally confirmed when the respective results of determinations according to the deformation speed and the deformation amount both show that the collision occurs. In this case, the increased precision of determination is obtained.

In the case of determinations based on the deformation amount, the deformation speed, and the acceleration, the determination of the occurrence of the collision may be finally confirmed when all of the respective results of determinations according to the deformation amount, the deformation speed, and the acceleration show that the collision occurs. In this case, the increased precision of determination is obtained.

In the present invention, if the respective deformation stresses of portions of a vehicle body are known, a work detecting means may be provided for detecting the work required to deform a portion of the vehicle body when the portion is deformed. In this case, the collision magnitude is determined on the basis of the work detected by the work detecting means. The work is obtained from the product of the aforementioned detected deformation speed, the deformation amount per a predetermined time, and the deformation stress of the deformed portion.

The maximum value of the detected deformation speed correlates with the relative velocity, and a value, which is obtained by dividing the work by a square value of the difference speed of the deformation speed in the predetermined time, correlates with the working mass. Accordingly, the relative velocity between a vehicle and an object colliding with the vehicle and the working mass can be estimated at the start of the collision. Based on the relative velocity and the working mass, the total energy of the collision can be estimated so that it can be determined how large the acceleration (deceleration) acting on the vehicle after a lapse of a predetermined time will be, that is, the collision magnitude can be determined.

According to the method for determining the collision magnitude on the basis of the work as mentioned above, the collision magnitude can be judged with extremely high precision.

In this structure, as mentioned above, the collision magnitude may be judged on the basis of the work and the aforementioned acceleration. When the acceleration of the vehicle is small, the weight of the object colliding with the vehicle can be estimated from the working mass because the working mass, corresponds to the equivalent mass of the object. By using this information, the collision magnitude can be judged with further high precision.

If the respective deformation stresses (rigidities) of portions around an end of a vehicle body are known, the collision energy can be detected from the deformation stresses and variation per unit time in deformation speed detected by the deformation speed detecting means. The variation in velocity (deceleration) acting on the vehicle body is in proportion to the collision energy. In the present invention, the collision magnitude may be determined on the basis of the collision energy. The occurrence of a collision is determined, and the collision magnitude is judged on the basis of the variation in velocity acting on the vehicle, which is obtained from the collision energy, whereby the occurrence of the collision and the collision magnitude can be judged with extremely high precision.

Though the deformation speed sensor is disposed on the front end of the vehicle for detecting a frontal collision in the above embodiment, a deformation speed sensor may be disposed on sides or the rear end for detecting a lateral collision or a rear-end collision.

For sensing a lateral collision, the deformation speed detecting means are placed on the sides of the vehicle and detect the distance or the variation in distance in the vehicle lateral direction between a deforming portion, including a peripheral structure and a stationary portion due to deformation of the vehicle. The deforming portion may be side peripheral portions of the vehicle, including at least door panels, door frames, front fenders, and B-pillars. The aforementioned acceleration detecting means is placed on a vehicle body frame, including side sills, B-pillars, and a center tunnel.

For sensing a rear-end collision, deformation speed detecting means are placed on the rear end of the vehicle and detect the distance or the variation in distance in the vehicle longitudinal (front-to-back) direction between a deforming portion, including a peripheral structure and a stationary portion due to deformation of the vehicle. The deforming portion may be a rear end portion of the vehicle, including at least a bumper, a bumper beam, and bumper fixing arms. The aforementioned acceleration detecting means is placed on a vehicle structural portion at an inner position relative to the rear end portion of the vehicle.

In any of the embodiments of the present invention, the deformation speed detected by the deformation speed sensor and the acceleration detected by the acceleration sensor may be not only the original outputs from the sensors but, also, data which has been treated by a filter process or digital process to extract characteristics relating to the deformation speed and the acceleration.

As described in the above, the present invention enables the accurate and early determination of a collision with a vehicle or the like. The present invention enables an occupant protective device to operate accurately and can achieve the reduction in output of an inflator for an airbag. The above embodiments are illustrative examples of the present invention. It should be understood that the present invention may take on other forms different from the examples described above and illustrated in the accompanying drawings.

I claim:

1. A collision detecting apparatus for a vehicle having adjacent portions that undergo displacement relative to each other during a vehicle collision, the collision detecting apparatus comprising:
   a vehicle portion speed detector mounted to the vehicle, the speed detector being arranged and configured to measure vehicle deformation speed during a vehicle collision with the deformation speed being the speed of the relative displacement between the adjacent portions of the vehicle;
   an acceleration detector mounted to the vehicle distinct from the vehicle portion speed detector, the acceleration detector independently from the vehicle portion speed detector measuring acceleration acting on the vehicle; and
   a controller configured to determine a collision occurrence with the vehicle based both on the measured vehicle deformation speed and the independently measured acceleration.

2. The collision detecting apparatus of claim 1 wherein the adjacent vehicle portions are disposed around an end or side of a vehicle.

3. The collision detecting apparatus of claim 2 wherein the vehicle portion speed detector continuously measures the deformation speed after a predetermined amount of deformation of at least one of the vehicle portions.

4. The collision detecting apparatus of claim 3 wherein the vehicle portion speed detector continuously measures the deformation speed after deformation of 20 millimeters or more of one of the vehicle portions.

5. The collision detecting apparatus of claim 2 wherein the adjacent vehicle portions are an outer portion of the vehicle and an inner portion of the vehicle, and the vehicle portion speed detector measures the deformation speed as the rate at which the outer vehicle portion and the inner portion of the vehicle approach one another, and the outer portion being located at a relatively low-rigid member of the vehicle and the inner portion being located at a relatively high-rigid member of the vehicle.

6. The collision detecting apparatus of claim 1 wherein the controller is configured to determine whether the deformation speed exceeds a predetermined value indicating a collision occurrence.

7. The collision detecting apparatus of claim 6 wherein the controller evaluates the progress of a collision occurrence from preselected parameters.

8. The collision detecting apparatus of claim 7 wherein the preselected parameters include the deformation speed, collision occurrence time and increasing or decreasing tendency of the deformation speed.

9. The collision detecting apparatus of claim 6 wherein the controller determines a collision occurrence when the deformation speed or the maximum value of deformation speed exceeds a predetermined value.

10. The collision detecting apparatus of claim 6 wherein the controller determines a collision occurrence when the deformation speed or the maximum value of the deformation speed exceeds the predetermined value and the acceleration or the velocity variation obtained by integrating the acceleration with time exceeds a predetermined value.

11. The collision detecting apparatus of claim 6 wherein the controller determines a collision occurrence when at least one of the deformation speed, or the maximum value of the deformation speed, the acceleration or the velocity variation obtained by integrating the acceleration with time exceeds the corresponding predetermined value.

12. The collision detecting apparatus of claim 6 further comprising a deformation amount detector to measure the deformation amount of at least a portion of a vehicle, and the controller determining whether there is a collision occurrence based on the deformation speed, the acceleration and the deformation amount.

13. The collision detecting apparatus of claim 12 wherein the controller determines a collision occurrence when the deformation speed or the maximum value of deformation speed exceeds the predetermined value, the acceleration or the velocity variation obtained by integrating the acceleration with time exceeds the predetermined value and the deformation amount exceeds a predetermined value.

14. The collision detecting apparatus of claim 1 wherein the acceleration detector is located at an inner position of the vehicle relative to the vehicle portion speed detector.

15. The collision detecting apparatus of claim 1 wherein the controller is configured to determine a collision occurrence based on acceleration and one or more other predetermined parameters, the controller changing the one or more other predetermined parameters according to deformation speed.

16. The collision detecting apparatus of claim 1 further comprising a deformation amount detector to measure deformation amount of at least a portion around an end of a vehicle.

17. The collision detecting apparatus of claim 16 wherein the controller determines a collision occurrence when the deformation speed or the maximum value of deformation speed exceeds the predetermined value and the deformation amount exceeds a predetermined value.

18. The collision detecting apparatus of claim 16 wherein the controller determines a collision occurrence when at least one of the deformation speed, the maximum value of deformation speed or the deformation amount exceeds the corresponding predetermined value.

19. The collision detecting apparatus of claim 1 wherein the controller determines a magnitude of a collision occurrence and further comprising a transmitter to provide output signals corresponding to the magnitude of a collision occurrence.

20. The collision detecting apparatus of claim 1 wherein the speed detector is at least located at the left and right front portions of the vehicle.

21. The collision detecting apparatus of claim 20 wherein the controller determines the type of collision occurrence.

22. A collision detecting apparatus for a vehicle comprising a speed detector mounted in a vehicle to measure a deformation speed of at least a portion around an end of a vehicle and a collision occurrence being detected from the deformation speed, a work detector to determine the work required for deformation of at least a portion around an end of a vehicle from the deformation speed and a known deformation stress of the at least a portion around an end of the vehicle, and a controller to determine a collision occurrence based on the work determined by the work detector.

23. The collision detecting apparatus of claim 22 further comprising an accelerator detector to measure the acceleration acting on the vehicle, and the controller determines a collision occurrence based on the work and the acceleration detected.

24. A collision detecting apparatus for a vehicle having adjacent portions, the collision detecting apparatus comprising a vehicle portion speed detector mounted in a vehicle to measure a vehicle deformation speed based on the rate at which a distance between the adjacent vehicle portions changes with a collision occurrence being detected based on the vehicle deformation speed, wherein the vehicle deformation speed detector comprises a rod carrying magnets and fixed to one of the adjacent vehicle portions, and a magnetic detector fixed to another one of the adjacent vehicle portions with a collision occurrence causing the rod magnets to move relative to the magnetic detector for being sensed thereby.

25. A collision detecting apparatus for a vehicle having adjacent portions, the collision detecting apparatus comprising a vehicle portion speed detector mounted in a vehicle to measure a vehicle deformation speed based on the rate at which a distance between the adjacent vehicle portions changes with a collision occurrence being detected based on the vehicle deformation speed, wherein the vehicle deformation speed detector comprises an energy emitter fixed to one of the adjacent vehicle portions for directing energy toward another one of the adjacent vehicle portions.

26. A collision detecting apparatus for a vehicle having adjacent portions, the collision detecting apparatus comprising a vehicle portion speed detector mounted in a vehicle to measure a vehicle deformation speed based on the rate at which a distance between the adjacent vehicle portions changes with a collision occurrence being detected based on the vehicle deformation speed, wherein the vehicle deformation speed detector comprises a switch carried on the vehicle for generating a signal upon displacement of one of the adjacent vehicle portions, and an acceleration sensor fixed to another one of the adjacent vehicle portions.

27. A passive safety system for a vehicle comprising:
an occupant restraint system;
a controller for actuating the occupant restraint system; and
a collision detector mounted in a vehicle and having a vehicle deformation speed detector to measure a vehicle deformation speed of a portion around an end or side of a vehicle with a collision occurrence being determined by the controller based on the vehicle deformation speed, wherein the vehicle deformation speed detector comprises a rod carrying magnets and fixed to the vehicle portion, and a magnetic detector fixed to another adjacent vehicle portion with a collision occurrence causing the rod magnets to move relative to the magnetic detector for being sensed thereby.

28. A passive safety system for a vehicle comprising:
an occupant restraint system;
a controller for actuating the occupant restraint system; and
a collision detector mounted in a vehicle and having a vehicle deformation speed detector to measure a vehicle deformation speed of a portion around an end or side of a vehicle with a collision occurrence being determined by the controller based on the vehicle deformation speed, wherein the vehicle deformation speed detector comprises an energy emitter fixed to a vehicle portion adjacent to the end or side vehicle portion for directing energy toward the end or side vehicle portion.

29. A passive safety system for a vehicle comprising:
an occupant restraint system;
a controller for actuating the occupant restraint system; and
a collision detector mounted in a vehicle and having a vehicle deformation speed detector to measure a vehicle deformation speed of a portion around an end or side of a vehicle with a collision occurrence being determined by the controller based on the vehicle deformation speed, wherein the vehicle deformation speed detector comprises a switch carried on the vehicle for generating a signal upon displacement of the vehicle portion, and an acceleration sensor fixed to another adjacent vehicle portion.

30. A collision detecting system for a vehicle comprising:
a collision sensor device having a variable threshold value that corresponds to a collision detection for activating a passive safety device of the vehicle; and
a vehicle deformation sensor distinct from the collision sensor device for independently sensing a degree of a predetermined vehicle deformation characteristic; and
a controller operable to vary the threshold value of the collision sensor device based on the degree of the sensed predetermined vehicle deformation characteristic.

31. The collision detecting system of claim 30, wherein the threshold value of the collision sensor device is an acceleration/deceleration value, the predetermined vehicle deformation characteristic is deformation speed of a portion of the vehicle, and the controller is operable to decrease the threshold acceleration/deceleration value with larger deformation speeds and to increase the threshold acceleration/deceleration value with smaller deformation speeds.

* * * * *